United States Patent [19]

Pagano

[11] Patent Number: 4,623,083

[45] Date of Patent: Nov. 18, 1986

[54] PIVOTAL FIXTURE APPARATUS FOR FABRICATING BOARD ON BOARD FENCE SECTIONS

[76] Inventor: Anthony L. Pagano, 909 Raritan Ave., Highland Park, N.J. 08904

[21] Appl. No.: 638,242

[22] Filed: Aug. 6, 1984

[51] Int. Cl.$^4$ .............................................. B23Q 3/00

[52] U.S. Cl. .................................... 227/152; 227/154; 269/287; 269/289 MR

[58] Field of Search ....................... 227/151, 152, 154; 269/17, 37, 40, 41, 43, 234, 287, 289 MR, 905, 910, 13, 14

[56] References Cited

U.S. PATENT DOCUMENTS

| | | | |
|---|---|---|---|
| 1,753,051 | 4/1930 | Junkers | 269/40 X |
| 1,822,270 | 9/1931 | Bunch | 269/40 X |
| 3,751,794 | 8/1973 | Kay | 227/152 |
| 3,844,466 | 10/1974 | Narita et al. | 227/152 X |
| 4,077,106 | 3/1978 | Lichtenstein et al. | 227/152 X |

*Primary Examiner*—Robert L. Spruill
*Assistant Examiner*—Taylor J. Ross
*Attorney, Agent, or Firm*—Arthur L. Plevy

[57] ABSTRACT

A fixture apparatus for forming a board on board fence or similar article comprises two angle frame sections which are pivotally secured to a base section. Each frame section can accommodate boards which are arranged in the vertical plane and also include means for accommodating stringers which are arranged horizontally and overlie the vertical boards. The frames can be moved in a first closed position where the stringers are emplaced between the boards and, in this position, are nailed to the boards. In a second open position the frames are moved in a V-shaped configuration. The nailed board and stringer assembly is held in the vertical position by means of a holding bar attached to a vertical beam emanating from the base. The fixture also includes an exit bar associated with a series of rollers to allow the completed assembly to be rolled from the fixture.

18 Claims, 6 Drawing Figures

PIVOTAL FIXTURE APPARATUS FOR FABRICATING BOARD ON BOARD FENCE SECTIONS

BACKGROUND OF THE INVENTION

This invention relates to a fixture for fabricating board on board fences or similar articles and more particularly to a pivotal fixture for positioning stringers with boards to create fence sections or pallet sections as will be explained.

There are many patents in the prior art which show devices of all sorts for fabricating various structures such as fences and fence sections. All such structures are designed to enable a craftsman to assemble such sections in a rapid and efficient manner.

U.S. Pat. No. 1,792,777 entitled SHOOK ASSEMBLING BENCH FOR CRATE MAKING issued to H. H. Stahl on Feb. 17, 1931 shows a frame assembly for fabricating a crate or a box. The apparatus uses a frame which includes movable anvils which support the preassembled ends of the crate. The ends of the crate are hung on the anvils which are then moved toward each other into parallel positions to enable the user to nail the frame portions to the slots. The apparatus as indicated is used for forming a crate and is relatively complicated.

U.S. Pat. No. 3,844,466 entitled PALLET MAKING DEVICE issued on Oct. 29, 1974 to T. Narita shows a pallet making apparatus which includes a transportable jig for holding the stringer members. Plank pieces are nailed to the stringer members in vertical planes.

U.S. Pat. No. 4,235,005 entitled APPARATUS FOR ASSEMBLING PALLETS issued on Nov. 25, 1980 to R. James shows a pallet apparatus which employs a cradle mounted on a frame for pivotal movement about a horizontal axis. Stringers are placed in the cradle and are supported by upright guides. The stringers are clamped in the longitudinal direction. A first set of deck boards is placed across the stringers and fastened to them. Then the cradle is unlocked and rotated where the pallet is turned over and another set of deck boards are then fastened to the stringers.

Other patents such as U.S. Pat. Nos. 3,169,249; 3,277,939; 4,039,111 and 4,077,106 show different apparatus for supporting stringers with respect to main boards to form pallet sections, fence sections, trusses and various other apparatus which essentially includes vertical boards secured to horizontal boards to thus form relatively rectangular structural sections for such devices.

As one can ascertain by reviewing the above noted patents, one will see that the structures depicted are relatively complicated and difficult to use. Much of the apparatus requires more than one person to operate the device. As indicated, these devices are relatively complicated and expensive to fabricate and difficult to maintain. It is, therefore, an object of the present invention to provide an improved apparatus which can be employed for fabricating pallets or fence sections in an efficient and reliable manner.

It is a further object of the present invention to provide a fixture or apparatus for fabricating a board on board fence which apparatus is simple to construct and efficient to use.

BRIEF DESCRIPTION OF THE PREFERRED EMBODIMENT

Apparatus for securing boards to stringers comprising a base, a left and a right frame assembly each pivotally coupled to said base and operative in a first closed position where said right and left frames extend in the vertical plane and in a second opened position where said right and left frames form a V-shaped configuration with respect to said base, first means located on said frames for holding boards in a relatively vertical position, second means located in said frames for holding stringers in a relatively horizontal position with said stringer overlying said boards when emplaced in said frames such that when said frames are in said first closed position said stringers are between said boards to enable nailing of said stringers to said boards to complete an assembled section and exit means coupled to said base and adapted to allow said assembled section to be rolled out of said apparatus when said frames are placed in said second opened position.

DETAILED DESCRIPTION OF THE FIGURES

Figure 1:
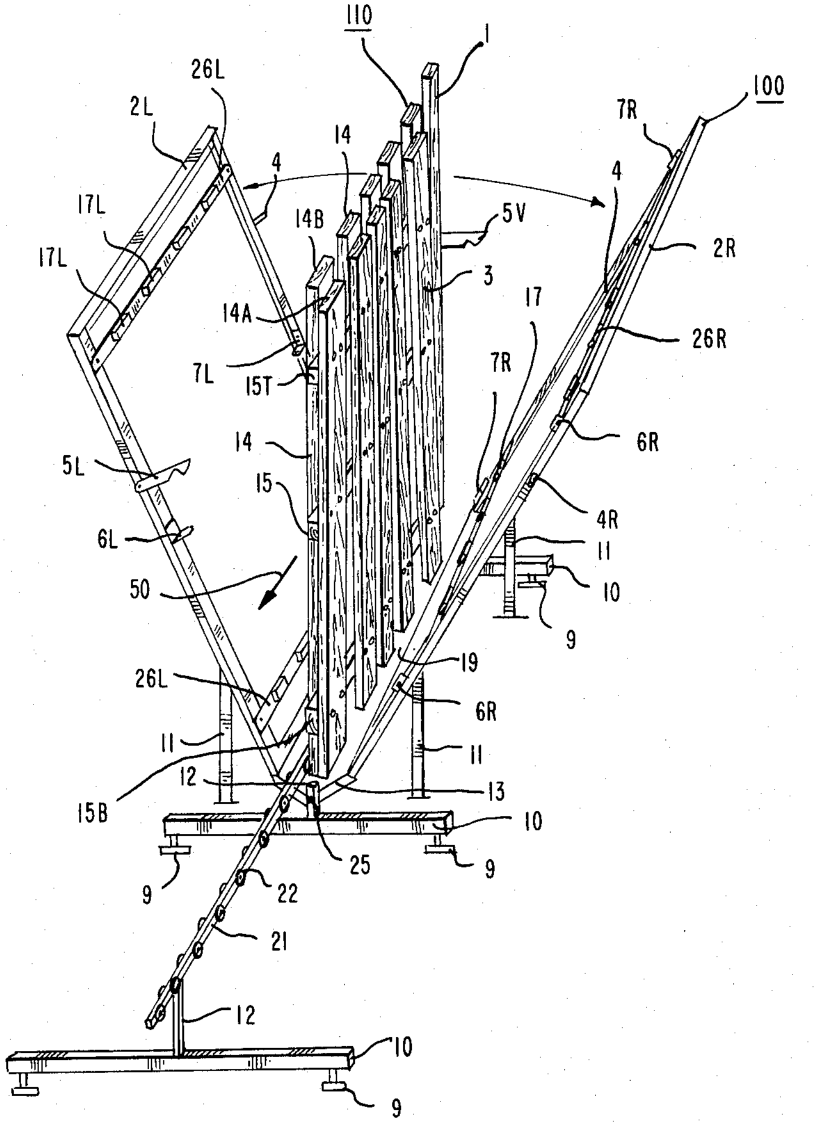
FIG. 1 is a perspective plan view of a fixture according to this invention showing a completed board and stringer assembly.

Referring to FIG. 1, there is shown a perspective plan view of a pivotal fixture 100 which as will be explained is employed to fabricate a board on board fence 110. Essentially, as seen from FIG. 1, the fence section 110 is shown at the center of the fixture 100 which is in its open position. A board on board fence essentially, consists of a series of longitudinal stringers 15 which are arranged in the horizontal plane and have secured to them boards as 14 in alternating positions. Thus as seen from FIG. 1, a first board 14A is secured to the right of the stringers while a second board 14B is secured to the left of the stringers. Thus the board at the right 14A can be considered as a top board while the board on the left 14B is a bottom board. This pattern alternates to produce the fence section 110 shown which as indicated is designated as a board on board fence. It is, of course, seen from FIG. 1, that the board on board fence is essentially a planar fence structure which can be used as a pallet or other structural item.

The board on board fence is an extremely popular fence structure based on the fact that the appearance from both sides is virtually the same, and the fence provides an aesthetic appearance while offering the user privacy.

It is further noted that the board on board structure is an extremely durable and rugged structure, and hence this particular orientation can be employed for constructing pallets, wall sections and so on.

Referring back to FIG. 1, the fixture 100 essentially consists of a vertical beam 1 which is secured to a main beam 19. The vertical beam 1 is fixed in the vertical plane. Pivotally coupled to the main beam 19 are left and right angle frames designated as 2L and 2R. The angle frames as indicated are pivotally secured to the main beam 19 by means of offset hinges 13. Essentially, the angle frames consist of steel or other strong structural members which are arranged to form a picture frame configuration. The angle frames have secured across the same at the top and bottom spacer block beams as 26L and 26R. The spacer block beams have spacer blocks extending therefrom as 17L. The spacer blocks are secured to the beams 26 and are spaced such that a board as 14 which is positioned in the vertical plane is inserted within the spaces between the spacer blocks 17L. In this manner as one can see, the left side angle frame 2L will accommodate left side boards as 14B while the right side frame 2R will accommodate the right side boards as 14A. Also shown secured to the vertical sides of the angle frames as 2L and 2R are stringer mechanisms designated as 6L for the left side with two mechanisms designated as 6R for the right side. As one can see from FIG. 1, the completed fence section 110 has three stringers designated by numeral 15 with the top stringer 15T and the bottom stringer 15B.

The stringer members 6L accommodate the center stringer 15 which stringers as will be explained are positioned on the frame between the member 6L and a corresponding member 7L for the left angle frame. The members 6R and 7R accommodate a stringer as 15T and 15B and are located on the right angle frame 2R. In this manner the frame can accommodate and hold in position the stringers 15 and the right and left board arrays as 14A and 14B before the boards are nailed to the stringers.

As will be further explained, secured to each side of the angle frames 2L and 2R are frame legs 11 which enable the user to pivot the angle frames 2L and 2R about the hinge 13 into an open position where the legs coact with the floor to hold the angle frames in the open position which is manifested by the V configuration shown in FIG. 1.

As will be further explained, the entire unit can be locked in the vertical position after the stringers 15 and boards 14 are arranged within the angle frames 2L and 2R. Locking of the unit is achieved by means of latch members as 5L which coact with associated catch members as 4R. Thus as seen in FIG. 1, latch member 5L which is a conventional latch appears on angle frame section 2L, while the catch 4R is positioned on the corresponding side of angle frame member 2R. The vertical beam 1 also has a catch member 5V which will coact with a suitable catch located on the opposite side of the angle frame 2R. The entire frame is supported by means of a back and a front base beam designated as 10 which base beam has left and right leveling ads designated by the numeral 9. In this manner the entire frame is positioned on the floor and extends in the vertical plane. The members 9 as indicated are leveling pads and, for example, are adjustably secured to the extending base members 10 so that the entire frame mechanism can be positioned on the floor with the angle frames 2R and 2L extending in the vertical plane.

Also shown secured to the vertical beam 1 is a holdup bar 3. The holdup bar 3 is positioned between the boards as 14A and 14B and, essentially, serves to hold the entire frame assembly in the vertical position after the boards have been nailed to the stringers, and as shown in FIG. 1.

As shown in FIG. 1, the completed fence section 110 is now ready for removal from the frame 100. The holdup bar 3 serves to hold the fence section 110 in the vertical position. Also shown located between the angle frames 2L and 2R is an exit bar 21. The exit bar 21 is directed across the entire frame as will be explained and has secured thereto a series of rollers 22. In this manner, the operator, after nailing the vertical boards 14 to the stringers 15, can now move the fence section via the exit bar 21 to roll the fence section out from the fixture 100.

The rollers 22 coact with the bottom of the fence section and allow one man to easily direct the completed section from the fixture 100 as designated by arrow 50. As one can see, the exit bar 21 extends from the fixture 100 where it is supported at a front end by a clearance bar 12 which is again secured to a base frame member 10 with leveling pads 9 which is identical in construction to the base frame supporting sections indicated by the same reference numerals.

As seen from FIG. 1, the angle frame sections 2L and 2R are coupled to a hinge arrangement formed with the main beam 19 by means of offset hinges 13. Thus as seen in FIG. 1, and as will be more clearly shown, the hinging elements 13 are offset from the angle frames 2R and 2L. The purpose of the offset hinge arrangement is to allow the fixture to accommodate the completed fence assembly as will be explained. The hinge is formed by means of a hinge pin 25 which as will be seen is located on the main beam 19.

Figure 2:
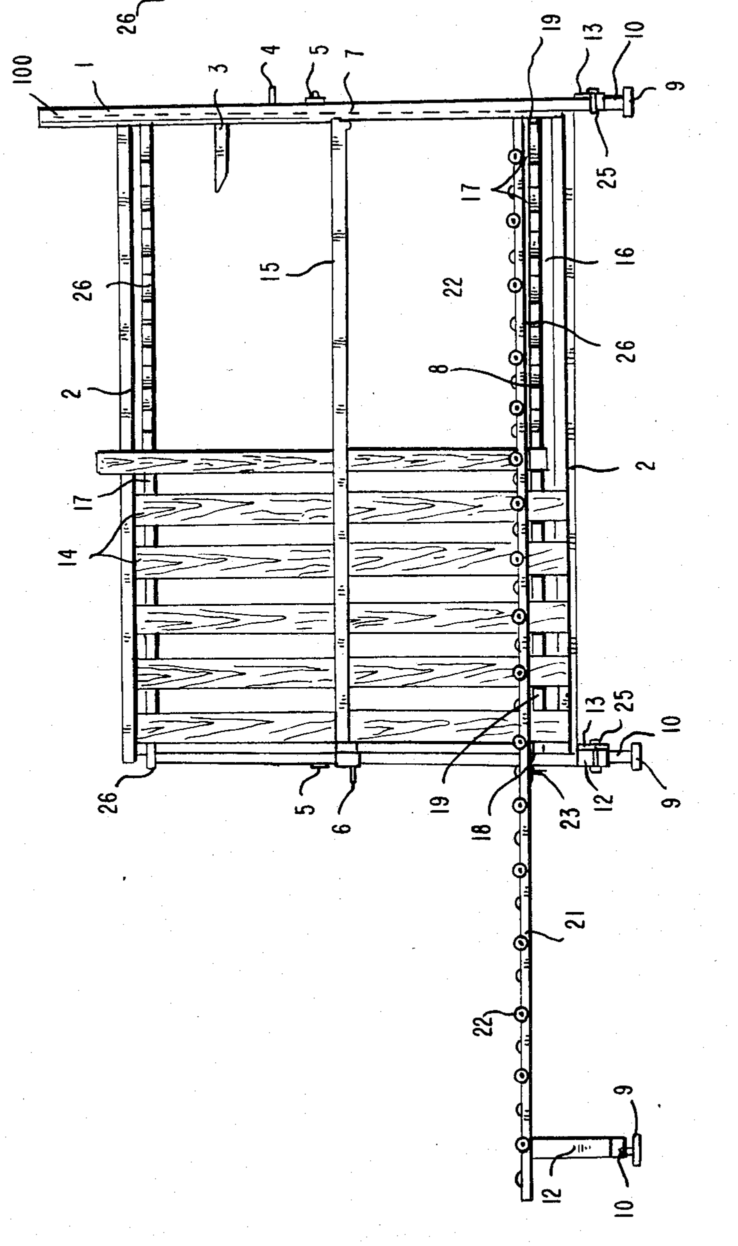
FIG. 2 is a side view of the fixture.

Referring to FIG. 2, there is shown a side view of the apparatus shown in FIG. 1, whereas the same reference numerals have been retained to designate the same parts. Essentially, FIG. 2 gives a clearer understanding of how the exit bar 21 is directed from the front of the fixture 100. One can also see from FIG. 2 the insertion of the boards 14 between the spacer blocks 17 in regard to the angle frames 2. The holdup bar 3 is also shown clearly in FIG. 2. In FIG. 2, it is seen that the center stringer 15 is directed between the spring loaded stringer rest 6 and an adjustable stringer rest 7. These were shown in FIG. 1 as 6R and 7R or 6L and 7L for the left and right frame sections respectively.

FIG. 2 also clarifies the structure of the roller assembly 8 as associated with the exit bar 21 and rollers 22, and as can be seen from FIG. 2, the roller assembly extends within the operating area of the fixture 100. Thus as one can ascertain from FIG. 2, the boards 14 are placed in position in the respective spaces between spacer blocks 17. The stringers as 15 are inserted in position between the stringer rests 6 and 7. The frame is closed by means of the latches 5 which coact with the appropriate catches 4 so that the entire fence section is assembled within the fixture prior to nailing the same.

Figure 3:
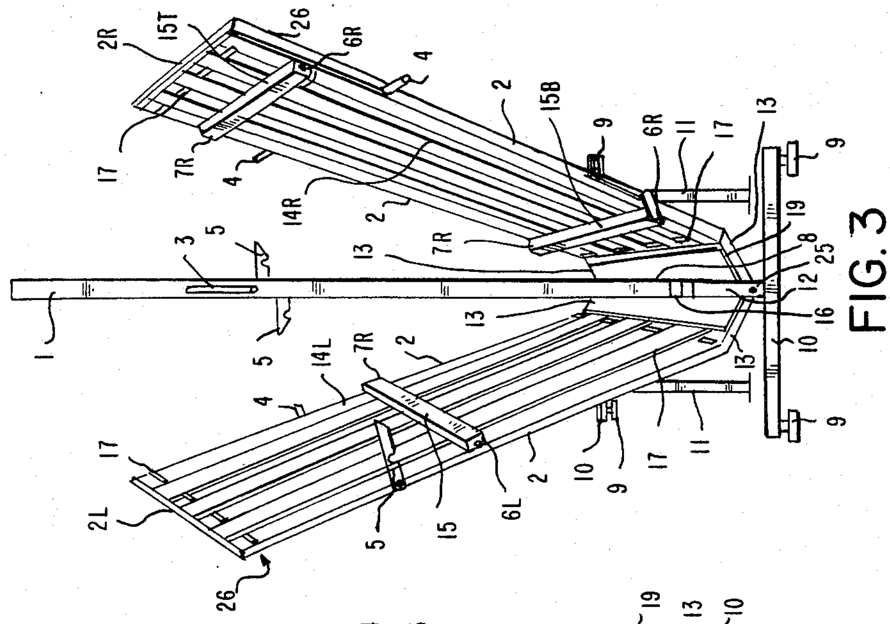
FIG. 3 is a front view of the fixture according to this invention.

Referring to FIG. 3, there is shown a more detailed assembly wherein the boards 14L are emplaced in the left angle frame 2L with the corresponding boards 14R positioned in the right angle frame 2R. There is also shown the center stringer 15 positioned between rests 6L and 7R associated with the angle frame 2L with stringer 15T and 15B emplaced within the rests 6R and 7R associated with the right angle frame 2R.

FIG. 3 also shows the nature of the offset hinge 13 as coupled to the angle frames 2L and 2R by means of the hinge pin 25. Thus as shown in FIG. 3, the boards and the stringers have been emplaced within the angle frame sections 2L and 2R. The entire frame assembly is now closed so that nailing can be accommodated. This is shown in FIG. 4.

Figure 4:
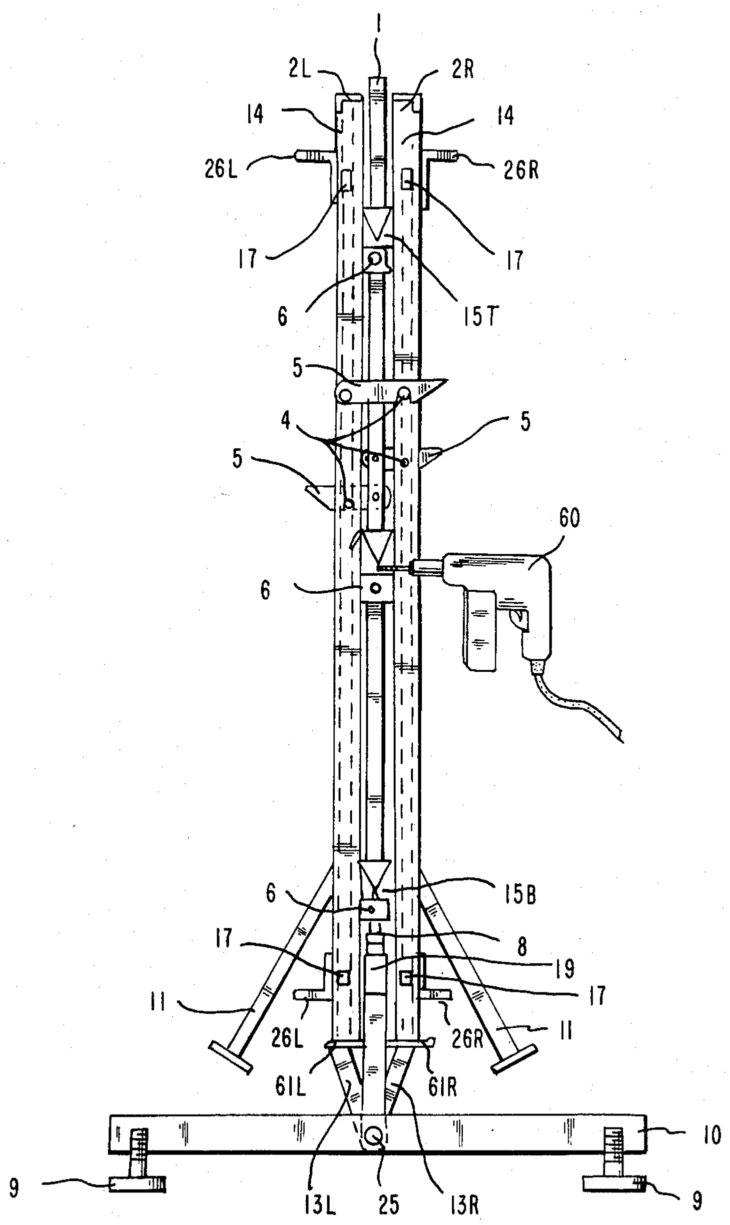
FIG. 4 is a front view showing the fixture assembly in a closed position for implementing nailing.

Once the frame assembly has been closed as depicted in FIG. 4, the operator can now employ a conventional nail gun as 60 to secure the stringers to the boards. This can be done from left and right sides in a simple and efficient manner. Essentially, the operator would walk around the entire frame assembly and place a nail or a series of nails at each board location which intersects with a stringer. As seen in FIG. 4, the frame is closed by means of the latch catches 4 coacting with the latches 5. Also as seen in FIG. 4 is the nature of the hinge pin 25 which rotatably couples the hinge bars 13L and 13R to the respective angle frames 2L and 2R by means of L-shaped brackets 61L and 61R. The spacer block beams as 26L and 26R are L-shaped members which are conventional angle irons which are clearly shown in FIG. 4.

Thus as seen from the above description, after the fence section has been nailed together, the frame can now be opened with the assembled fence sections supported by means of the holdup bar 3. The bottom stringer moves on the central located exit assembly which consists of the exit bar 21 and the rollers 22 and now can easily remove the completed section from the open V-shaped fixture by rolling the nailed stringer along roller 21.

Figure 5:
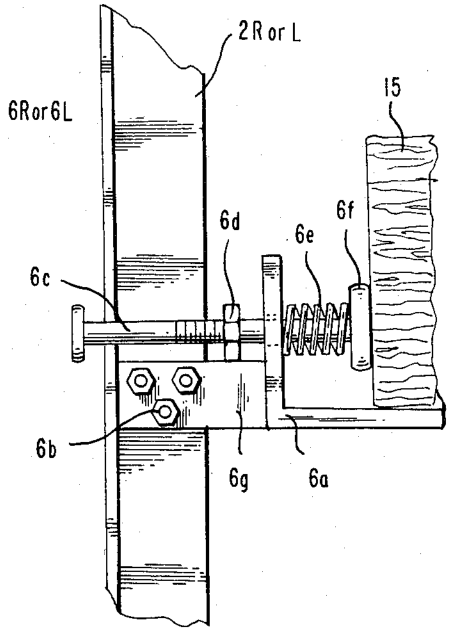
FIG. 5 is a partial view showing a spring locked stringer rest assembly employed in this invention.

Referring to FIG. 5, there is shown a more detailed view of the spring loaded fixture rest as 6R or 6L as associated with the left or right frame 2R or 2L. The stringer rests essentially consist of an angular section of an L-shaped configuration 6A.

Figure 6:
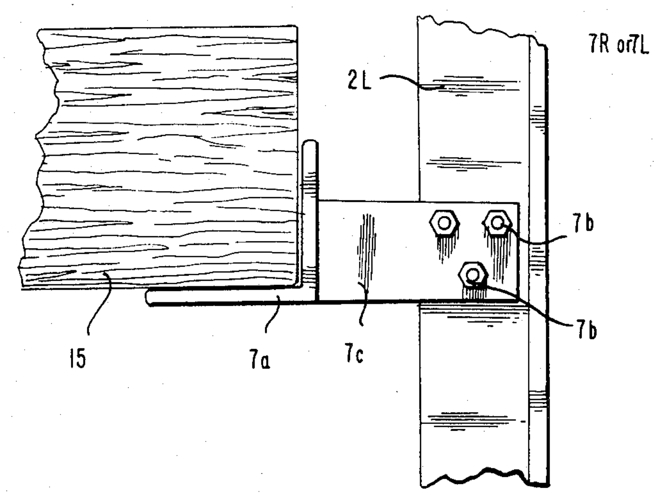
FIG. 6 is a partial view showing a coacting stringer rest assembly according to this invention.

A threaded pressure pin 6C is directed through the vertical side of the bracket 6A and is associated with a stop nut 6D. The pin 6C is inserted through an aperture in the angle 6A where it is terminated in an end flange 6F. Located between the flange 6F and the vertical side of the L-shaped bracket 6A is a spring 6E. As can be seen from FIG. 5, the end of the stringer 15 is positioned against the flange 6F where the other end is then inserted into the corresponding bracket 7 which is shown in FIG. 6. In this manner the stringer is securely held in position prior to nailing. The L-shaped bracket 6A is coupled to a mounting plate 6G which plate is secured to the angle frame 2R or 2L by means of three bolts designated as 6B. With the bolt arrangement, one can adjust the orientation of the bracket 6A with respect to the frame.

Referring to FIG. 6, there is shown a schematic of the corresponding bracket as 7R or 7L which is used to hold the other end of the stringer 15. The stringer rest as 7 is secured to the angle frame as 2L by means of the mounting plate 7C which is coupled to the angle frame 2L by means of the adjustment bolts 7B. The mounting plate 7C is coupled to an L-shaped angle 7A which as indicated receives the opposite end of the stringer 15. Thus as can be seen, the stringer is firmly held in poisition by means of the spring loaded stringer rest assembly 6 and the stringer rest assembly 7. In the particular example given above, there are three stringers and hence there are three assemblies 6 and 7 necessary to secure the three stringers in position.

Thus as one can see in regard to the above, the fixture essentially consists of a pivotal frame which consists of a left and a right angle section 2R and 2L, each of a picture frame configuration and each secured to a main horizontal beam by means of an offset hinge. The angle frames can pivot between a first closed position and a second open position relative to the base where in the second open position the fixture is of a V-shaped configuration. In the closed position the fixture is in the vertical plane and allows boards inserted between spacers on the angle frames to be secured to stringers which are held in position by means of stringer rests.

The base includes a plurality of rollers which extend along an exit bar to permit the assembled fence to be removed from the fixture after the boards have been secured to the stringers. In the configuration shown, two stringers and an array of boards for one side are positioned on one angle frame section 2R while the remaining stringers and the opposite boards are positioned on the other angle frame section 2L. The boards and stringers are arranged on the angle frames in the open position and the fixture is then closed and latched so that nailing can take place from both sides.

A holding bar holds the assembled section in position when the frame is again opened after nailing and allows the section to remain in the vertical position when the fixture is opened in the V-shaped configuration. The exit bar is positioned between the boards, and the bottom stringer 15B contacts the rollers 21 to allow the operator to push the section from the fixture.

I claim:

1. Apparatus for securing boards to stringers comprising, a base, a left and a right frame assembly each pivotally coupled to said base and operative in a first closed position where said right and left frames extend in the vertical plane and in a second opened position where said right and left frames form a V-shaped configuration with respect to said base, first means located on said frames for holding boards in a relatively vertical position, second means located on said frames for holding stringers in a relatively horizontal position with said stringers overlying said boards when emplaced in said frames such that when said frames are in said first closed position said stringers are between said boards to enable nailing of said stringers to said boards to complete an assemblcd section and exit means coupled to said base and adapted to allow said assembled section to be rolled out of said apparatus when said frames are placed in said second opened position, said exit means comprising a longitudinal extending beam directed from said base and having a plurality of spaced rollers on a surface thereof to allow a user to place said assembled section on said rollers to move the same out of said frame.

2. The apparatus according to claim 1 wherein said base includes a main longitudinal beam having coupled thereto relatively transverse members for supporting said beam on a horizontal surface.

3. The apparatus according to claim 2 wherein said left and right frames each are of a picture frame configuration with parallel top and bottom sides and parallel left and right sides and are pivotally secured to said main beam by means of offset hinges.

4. The apparatus according to claim 3 wherein said first means for holding said boards comprises a top and a bottom beam directed across said frame from said left to said right side and parallel to said top and bottom sides with each beam having spacer blocks positioned on a surface and spaced according to the width of a board to be accommodated when emplaced between said spacer block and directed from said top to said bottom beam.

5. The apparatus according to claim 3 wherein said second means comprises a left and a right L-shaped bracket with said left bracket secured to said left side of said left frame assembly and said right bracket secured to a right side of said right frame assembly with the bottom surfaces of said brackets positioned such that a stringer can be held by said bottom surfaces of said brackets in a position relatively parallel to said top and bottom sides of said frame.

6. The apparatus according to claim 5 wherein at least one of said brackets includes spring biased means coupled to an arm of said L-shaped bracket and adapted to exert a force on the end of a stringer emplaced between said left and right brackets.

7. The apparatus according to claim 1 further including a vertical beam coupled to said base and having located thereon holding means for coacting with said completed assembled section to maintain the same in a vertical position when said frames are operated in said second opened position.

8. The apparatus according to claim 1, further including latching means coupled to said right and left frames to keep the same locked in said first closed position.

9. The apparatus according to claim 1, further including extending leg members coupled to the outer surface of said frame assemblies and adapted to hold the frame assemblies in said V-shaped configuration when said frame assemblies are pivoted into said second opened position.

10. A fixture apparatus for securing boards to stringers, comprising:

a base section, a vertical beam extending from said base section, a left and a right frame assembly each pivotally coupled to said base and operative in a first closed position where said right and left frames extend in the vertical plane and in a second opened position where said right and left frames when pivoted form a "V" configuration with respect to said base, first means located on said frames for holding placed boards in a relatively vertical position, second means located on said frames for holding stringers in a relatively horizontal position for overlying said boards when placed in said frames whereby said stringers are positioned between said boards when said frames are placed in said first closed position to enable nailing of said stringers to said boards to complete an assembled section, means coupled to said vertical beam and directed in the space between said boards to hold said assembled section in a vertical position when said frames are operated in said second opened position and exit means coupled to said base and operative to allow said assembled section to be moved out of said fixture apparatus when said frames are placed in said second opened position, said exit means comprising a longitudinal extending beam extending from said base and having a plurality of spaced rollers on a surface thereof to allow a user to place said assembled section on said rollers to move the same out of said frame assembly.

11. The fixture apparatus according to claim 10, wherein said left and right frame assemblies are each rectangular in configuration and of a picture frame configuration with parallel top and bottom sides and parallel left and right sides.

12. The fixture apparatus according to claim 11, wherein said left and right frame assemblies are pivotally coupled to said base by hinge means comprising a hinge pin coupled to said base and having coupled thereto an extending right arm and an extending left arm to form a V type configuration with the right arm coupled to the bottom side of said right frame assembly and the left arm coupled to the bottom side of said left frame assembly.

13. The fixture apparatus according to claim 11 wherein said first means for holding said boards comprises a top and a bottom beam directed across said frame from said left to said right sides and parallel to said top and bottom sides with each beam having spacer blocks positioned on the surface and spaced according to the width of a board to be accommodated when emplaced between said spacer blocks and directed from said top to said bottom beam.

14. The apparatus according to claim 11 wherein said second means comprises a left and a right L-shaped bracket with said left bracket secured to said left side of said frame assembly and said right bracket secured to a right side of said frame assembly with the bottom surfaces of said brackets positioned such that a stringer can be supported by said bottom surfaces of said brackets in a position relatively parallel to said top and bottom sides of said frame assembly.

15. The apparatus according to claim 14, wherein at least one of said brackets includes spring biased means coupled to an arm of said L-shaped bracket and adapted to exert a force on the end of a stringer emplaced between said right and left brackets.

16. The apparatus according to claim 10 further including latching means coupled to said right and left frame assemblies to keep the same secure in said first closed position.

17. Apparatus for securing boards to stringers comprising:

a base member including an elongated beam having first and second transverse members at each end for supporting said base member on a horizontal surface, a vertical beam coupled to said base member at one end and extending in the vertical plane, a left and a right rectangular frame assembly pivotally coupled to said base member, each frame assembly having top and bottom parallel sides with right and left parallel sides with said bottom sides of each assembly pivotally coupled to said base member to allow said frames to be positioned in a first closed position where said frames extend in the vertical plane and in a second opened position where said frames when pivoted form a V-shaped configuration, first and second spaced beams associated with each frame assembly located on each frame with one directed nearer and parallel to the top side of said associated frame assembly and one directed near and parallel to the bottom side of said associated frame assembly with said spacer beams having spacing means on a surface to allow a board to be positioned transverse to said spacer beams within said spacing means, whereby said right and left frame assemblies can each accommodate a plurality of boards positioned relatively in the vertical plane, stringer bracket means coupled to the left and right sides of each frame and adapted to hold a stringer transverse to said boards in said frame assembly whereby when said frame assemblies are in said first closed position said boards can be secured to said stringers to form a completed structure to hold the same in said vertical plane when said frames are pivoted to said second opened position, and exit means coupled to said frame and operative to coact with said structure to allow the same to be rolled out of said apparatus in said second position.

18. The apparatus according to claim 17, wherein said frames are pivotally coupled to said base member by means of offset hinges.

* * * * *